United States Patent
Park et al.

(12)

(10) Patent No.: US 6,355,872 B2
(45) Date of Patent: Mar. 12, 2002

(54) RANDOM PLAY CONTROL METHOD AND APPARATUS FOR DISC PLAYER

(75) Inventors: Sang On Park; Yong Hee Han, both of Kyounggi-do (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/824,226

(22) Filed: Apr. 3, 2001

(30) Foreign Application Priority Data

Apr. 3, 2000 (KR) ........................................ 2000-17364

(51) Int. Cl.[7] .......................... A63H 5/00; G04B 13/00; G10H 7/00
(52) U.S. Cl. .............................. 84/609; 84/618; 369/30
(58) Field of Search .............................. 369/30, 33, 34; 84/609, 634, 615, 618

(56) References Cited

U.S. PATENT DOCUMENTS 4,787,073 A * 11/1988 Masaki ........................ 369/32
4,899,331 A * 2/1990 Masaki et al. ................ 369/32
4,949,322 A * 8/1990 Kimura et al. ................ 369/32
5,051,973 A * 9/1991 Shiba et al. ................... 369/36
6,121,533 A * 9/2000 Kay

* cited by examiner

Primary Examiner—Jeffrey Donels

(57) ABSTRACT

Disclosed is a random play control method and apparatus for a disc player. According to the random play control method and apparatus, music information is read out from discs inserted in N (N≥2) disc drives, and then stored. The disc drive subject to random play is selected, and when a plurality of disc drives subject to the random play are selected, music to be first reproduced is determined. Then, a weighted value that determines how long reproduction of the music subject to the random play is continuously performed in the specified disc drive is allocated to the respective disc drive, in a such manner that the weighted value of the disc drive which stores the music selected to be reproduced is greater than the weighted value of the disc drive which does not store the music selected to be reproduced. The music to be reproduced in the next order and reproduction order thereof are determined according to the determined weighted value, and the disc where the corresponding music is recorded is reproduced by driving the corresponding disc drive in accordance with the determined reproduction order.

17 Claims, 3 Drawing Sheets

RANDOM PLAY CONTROL METHOD AND APPARATUS FOR DISC PLAYER

BACKGROUND OF THE INVENTION

1. Field of the Invention

The present invention relates to a random play control method and apparatus for a disc player, and more particularly to a random play control method and apparatus for a compact disc player having a plurality of disc drives, for example, such as both a record/playback drive and a dedicated playback drive, which can perform a random play function that randomly selects and reproduces music stored in the disc drives and in discs inserted in the respective disc drives.

1. Description of the Related Art

With the spread of compact disc players, an audio compact disc commands tremendous popularity based on its prominent quality of sound, and takes its place as the core audio medium. Also, with the spread of portable compact disc players, a user can listen to music recorded in the compact disc even during his/her movement.

Some compact disc players are provided with a random play function. The random play is a function of randomly reproducing music stored in discs inserted in disc drives, without reproducing the music in their recording order, by selecting and reproducing the music through a random process, so that the user can enjoy the music in a dynamic reproduction order.

The random play may be adopted in a disc player having only one record/reproduction disc drive, a disc player having only one dedicated reproduction disc drive, or a disc player having both the record/reproduction disc drive and the dedicated reproduction disc drive.

In comparison to the random play performed through the random process with respect to a disc inserted in a disc drive, the random play performed through the random process with respect to discs inserted in a plurality of disc drives provides the reproduction of music in a diverse reproduction order given between the two disc drives as well as the random reproduction of music stored in the same disc drive, and thus gives the user the effect of listening to music stored in new discs at all times.

However, in case of the random play performed with respect to the discs inserted in a plurality of disc drives, the disc drive being reproduced is changed at any time, and this causes the response speed of the disc drives to deteriorate.

For instance, the random play may be performed for both the discs inserted in the record/reproduction disc drive A and the dedicated reproduction disc drive B.

If the music being first reproduced is stored in the drive A, the music to be reproduced in the second reproduction order in the drive B, the music to be reproduced in the third order in the drive A, and the music to be reproduced in the fourth order in the drive B, respectively, the corresponding music should be searched and reproduced as the two drives A and B are alternately driven.

Such a frequent driving operation performed between the two drives A and B causes the power consumption to increase, and causes the search response speed to decrease since it is repeated that, after the reproduction of the music in one drive is terminated, the other drive is driven and then the music to be reproduced is searched from the corresponding disc.

As a result, the random play performed in the conventional compact disc player having a plurality of disc drives has the disadvantages in that it suffers from increased power consumption and decreased response speed due to the frequent driving operation between the two disc drives.

SUMMARY OF THE INVENTION

Therefore, an object of the present invention is to solve the problems involved in the related art, and to provide a random play control method and apparatus for a disc player which can reduce the frequent driving operation performed between respective disc drives during the performance of random play, and improve the search response speed.

In determining the music subject to random play and the reproduction order of the music, the random play control method and apparatus according to the present invention determines with respect to each disc drive a weighted value for determining how long the reproduction of music is continuously performed in a specified disc drive, determines a reproduction order of the music subject to random play in accordance with the determined weighted value of the disc drive, and then reproduces the corresponding music in the determined reproduction order.

Also, if the music to be reproduced in the next reproduction order is not stored in the currently reproducing disc drive, but is stored in the other disc drive, the random play control method and apparatus of the present invention starts in advance of the reproduction thereof from the corresponding disc drive to be driven in the next reproduction order before a predetermined time before the music being currently reproduced terminates, and thus the reproduction of the next music is continuously performed without interruption, to improve the search response speed.

In one aspect of the present invention, there is provided a random play control method for a disc player comprising the steps of (a) obtaining music information from discs inserted in N (N≧2) disc drives, (b) determining music subject to random play and a reproduction order of the music by determining weighted values of the respective disc drives using the music information, and (c) randomly reproducing the music in the determined reproduction order.

In another aspect of the present invention, there is provided a random play control apparatus for a disc player, comprising N (N≧2) disc drives for reproducing data recorded in discs, means for detecting music information from the discs inserted in the disc drives, means for determining music subject to random play and a reproduction order of the music from the detected music information by applying different weighted values to the respective disc drives, and means for reproducing the corresponding music from the corresponding disc by driving the corresponding disc drive in accordance with the determined reproduction order.

In the present invention, the weighted value is for determining how long the random play of the music is continuously performed in a specified disc drive.

Also, in the present invention, the weighted value of the currently reproducing disc drive is determined to be greater than that of the other disc drive, or the same weighted value is determined with respect to all the disc drives.

Also, according to the present invention, if the music to be reproduced in the next reproduction order is not stored in the currently reproducing disc drive, but is stored in the other disc drive, the corresponding disc drive is controlled to be in a reproduction standby state by starting in advance of the reproduction thereof from the corresponding disc drive to be driven in the next reproduction order before a predetermined time before the music being currently reproduced terminates.

Also, according to the present invention, the random process of the music stored in the disc drives and the discs inserted in the disc drives in a compact disc player provided with a plurality of disc drives is performed in a manner that the selection weighted value of the disc that stores the selected music is determined to be greater than that of the disc that does not store the selected music, and thus the frequency of changing the disc drive that is reproducing the music is reduced to stably perform the random play.

Also, if the music to be reproduced in the next reproduction order is stored in the other disc drive, the corresponding disc drive is in the reproduction standby state by starting in advance of the reproduction thereof from the corresponding disc drive before the music being currently reproduced terminates, and thus the search response speed can be improved.

BRIEF DESCRIPTION OF THE DRAWINGS

The above object, and other features and advantages of the present invention will become more apparent after a reading of the following detailed description when taken in conjunction with the drawings, in which.

DETAILED DESCRIPTION OF THE PREFERRED EMBODIMENTS

Hereinafter, the present invention will be described with respect to the preferred embodiments illustrated in the annexed drawings.

Figure 1:
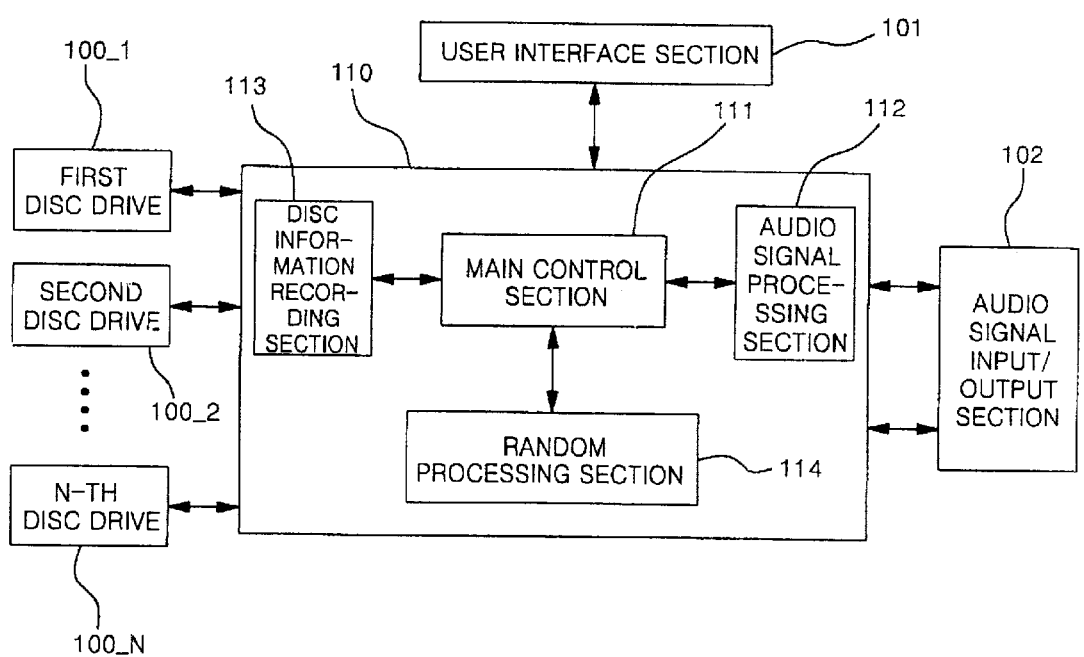
FIG. 1 is a block diagram illustrating the construction of a compact disc player incorporating the random play means according to the present invention.

FIG. 1 is a block diagram illustrating the construction of a compact disc player incorporating the random play means according to the present invention.

Referring to FIG. 1, the compact disc player incorporating the random play means according to the present invention includes a plurality of disc drives 100-1, 100-2, . . . , 100-N for driving inserted discs and reproducing data recorded in the inserted discs, a user interface section 101 for inputting user's control commands, an audio signal input/output section 102 for inputting/outputting digital and analog signals, and a system control section 110 composed of a main control section 111 for performing the user's control commands transferred from the user interface section 101, an audio signal processing section 112 for processing an audio signal transmitted/received through the audio signal input/output section 102, a disc information recording section 113 for storing data recording information of the discs inserted in the plurality of disc drives 100-1, 100-2, . . . , 100-N, and a random processing section 114 for randomly selecting music stored in the plurality of disc drives 100-1, 100-2, . . . , 100-N, and stored in the discs inserted in the plurality of disc drives 100-1, 100-2, . . . , 100-N.

The operation of the random play control apparatus as constructed above according to the present invention will now be explained with reference to FIGS. 1 and 2.

Figure 2:
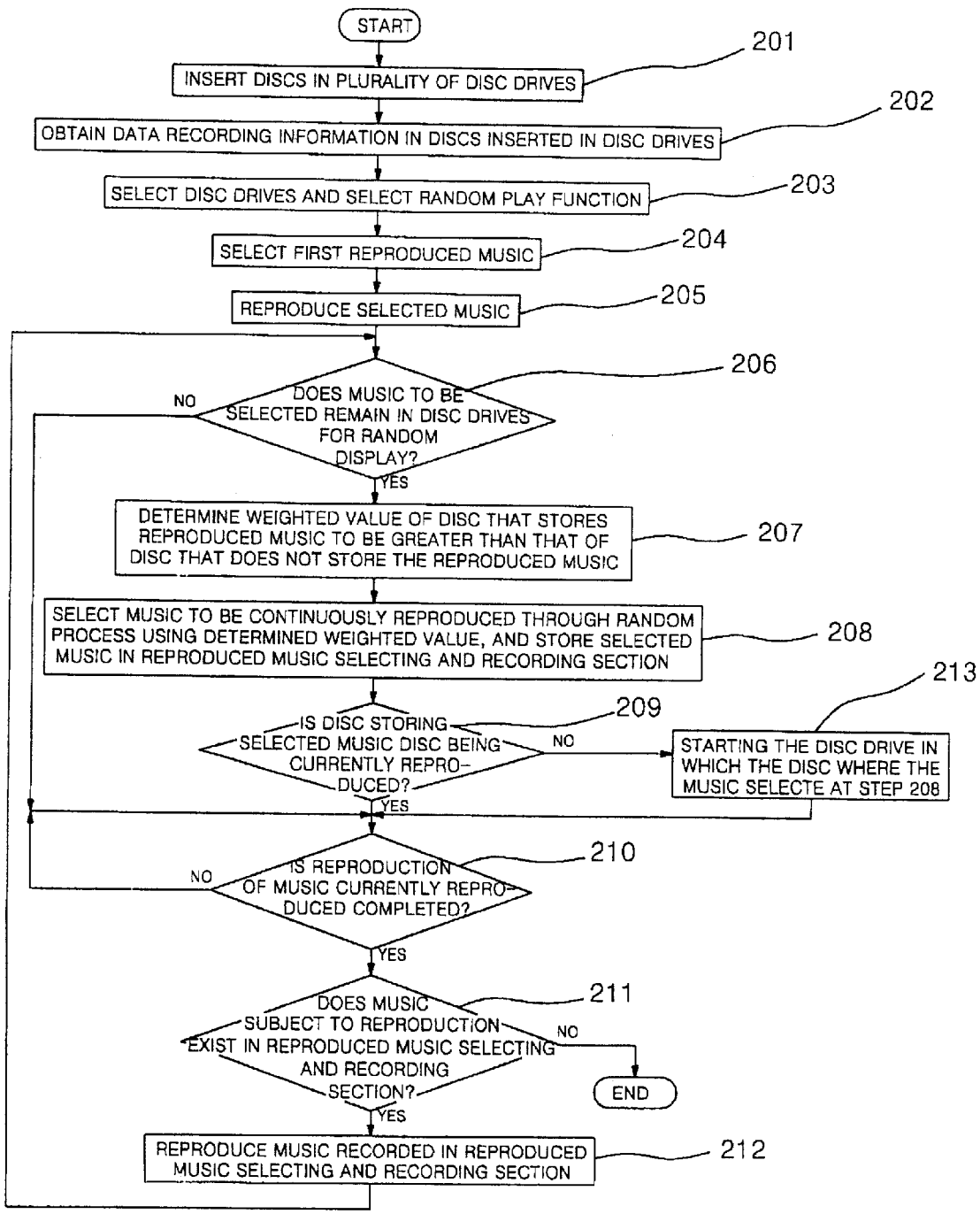
FIG. 2 is a flowchart illustrating the random play control method according to the first embodiment of the present invention.

FIG. 2 is a flowchart illustrating the random play control method according to the first embodiment of the present invention.

Referring to FIG. 2, if discs are inserted in a plurality of disc drives 100-1, 100-2, . . . , 100-N (step 201), the system control section 110 obtains data recording information from lead-in regions of the discs inserted in the disc drives 100-1, 100-2, . . . , 100-N, and stores the obtained data recording information in the disc information recording section 113 (step 202).

Meanwhile, if the user wishes to perform the random play for selecting the reproduced music in accordance with the random process, he/she selects the disc drives 100-1, 100-2, . . . , 100-N, and requests the performance of the random play function to the system controller 110 through the user interface section 101 (step 203).

At this time, the user may designate the disc where the music to be firstly reproduced is stored, and select the music stored in the disc through the random process. Also, the user may select the discs which are inserted in the disc drives 100-1, 100-2, . . . , 100-N selected at step 203 and the music to be reproduced by performing the random process with the selection weighted values of all the discs determined to be the same (step 204).

Accordingly, the system control section 110 reproduces the music selected at step 204 (step 205), and judges whether any music to be selected remains in the disc drives 100-1, 100-2, . . . , 100-N selected at step 203 (step 206).

If any music to be selected remains in the disc drives 100-1, 100-2, . . . , 100-N as a result of judgement at step 206, the system control section 110 determines the selection weighted value of the disc, where the music being currently reproduced is stored, to be greater than that of the other disc, where the music being currently reproduced is not stored, through the random process (step 207).

For instance, if the music being currently reproduced is stored in the disc drive A in a state that the random play is performed with respect to the two disc drives A and B, the disc selection weighted value which is applied during the performance of the random process such that the selection weighted value of the disc drive A is determined to be greater than that of the disc drive B. For example, (selection weighted value of disc drive A):(selection weighted value of disc drive A)=70:30.

That is, the system control section 110 selects the music to be continuously reproduced by performing the random process using the selection weighted value determined at step 207, and stores the selected music in a reproduced music selecting and recording section (step 208).

Meanwhile, the system control section 110 judges whether the disc, where the music selected at step 208 is stored, is the disc being currently reproduced (step 209). If the disc where the music selected at step 208 is stored is the disc being currently reproduced as a result of judgement, the system control section 110 checks whether the reproduction of the music currently reproduced is completed (step 210). If the reproduction of the music currently reproduced is completed as a result of checking at step 210, the system control section 110 judges whether any music subject to reproduction exists in the reproduced music selecting and recording section (step 211).

Here, if no music subject to reproduction exists in the reproduced music selecting and recording section as a result of judgement at step 211, the system control section 110 terminates the performance of the random play. If any music subject to reproduction exists in the reproduced music selecting and recording section, the system control section 110 reproduces the music recorded in the reproduced music selecting and recording section (step 212), and then performs the process following the step 206.

Also, if the disc where the music selected at step 208 is stored is not the disc being currently reproduced as a result of judgment at step 209, the system control section 110, with the completion of reproduction of the music currently reproduced, prepares for continuous and stable reproduction of the music selected at step 208 by starting the disc drive in which the disc where the music selected at step 208 is stored in advance of reproduction therefrom for a predetermined time (step 213), and then performs the process following the step 210.

In performing the random play through the random process for selecting the music to be reproduced at steps 206 to 208, the music once reproduced may be excluded from the random process, and the random process be performed for only the music not reproduced.

Figure 3:
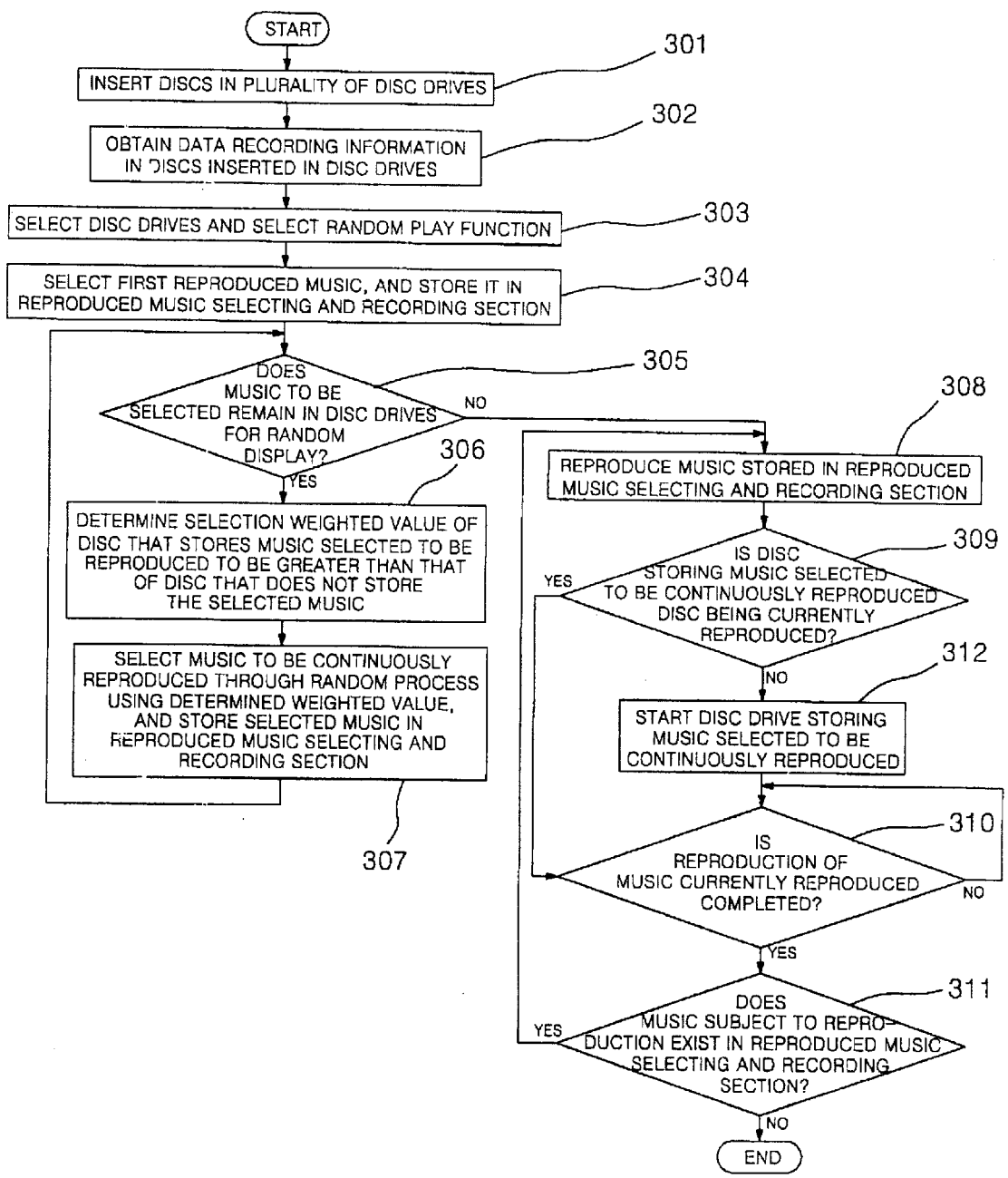
FIG. 3 is a flowchart illustrating the random play control method according to the second embodiment of the present invention.

FIG. 3 is a flowchart illustrating the random play control method according to the second embodiment of the present invention.

Referring to FIG. 3, if discs are inserted in a plurality of disc drives 100-1, 100-2, . . . , 100-N (step 301), the system control section 110 obtains data recording information from lead-in regions of the discs inserted in the disc drives 100-1, 100-2, . . . , 100-N, and stores the obtained data recording information in the disc information recording section 113 (step 302)

Meanwhile, if the user wishes to perform the random play for selecting the reproduced music in accordance with the random process, he/she selects the disc drives 100-1, 100-2, . . . , 100-N, and requests the performance of the random play function to the system controller 110 through the user interface section 101 (step 303).

At this time, the user may directly designate the disc, select the music to be first reproduced through the random process, or store the selected music in a reproduced music selecting and recording section. Also, the user may select the discs which are inserted in the disc drives 100-1, 100-2, . . . , 100-N selected at step 303 and the music to be reproduced by performing the random process with the selection weighted values of all the discs determined to be the same, and store the selected music in the reproduced music selecting and recording section (step 304).

Accordingly, the system control section 110 judges whether any music to be selected remains in the disc drives 100-1, 100-2, . . . , 100-N to perform the random play (step 206).

At this time, if any music to be selected remains in the disc drives 100-1, 100-2, . . . , 100-N as a result of judgement at step 305, the system control section 110 determines the selection weighted value of the disc, where the music being currently reproduced is stored, to be greater than that of the other disc, where the music being currently reproduced is not stored, through the random process (step 306).

Accordingly, the system control section 110 selects the music to be continuously reproduced by performing the random process using the selection weighted value determined at step 306, stores the selected music in the reproduced music selecting and recording section, and then performs the process following the step 305.

Meanwhile, if any music to be selected does not remain in the disc drives 100-1, 100-2, . . . , 100-N as a result of judgement at step 305, the system control section 110 reproduces the music stored in the reproduced music selecting and recording section (step 308).

At this time, the system control section 110 judges whether the disc, where the music selected to be continuously reproduced to follow the music being currently reproduced at step 308 is stored, is the disc being currently reproduced (step 309). If the disc where the music selected to be continuously reproduced is stored is the disc being currently reproduced as a result of judgement at step 309, the system control section 110 checks whether the reproduction of the music currently reproduced is completed (step 310).

If the reproduction of the music currently reproduced is completed as a result of checking at step 310, the system control section 110 judges whether any music subject to reproduction exists in the reproduced music selecting and recording section (step 311).

If no music subject to reproduction exists in the reproduced music selecting and recording section as a result of judgement at step 311, the system control section 110 terminates the performance of the random play. If any music subject to reproduction exists in the reproduced music selecting and recording section, the system control section 110 reproduces the music recorded in the reproduced music selecting and recording section (step 308), and then performs the process following the step 308.

Meanwhile, if the disc where the music selected to be continuously reproduced is stored is not the disc being currently reproduced as a result of judgement at step 309, the system control section 110, with the completion of reproduction of the music currently reproduced, prepares for continuous and stable reproduction of the music selected to be continuously reproduced by starting the disc drive in which the disc where the music selected to be continuously reproduced is stored in advance for a predetermined time (step 312), and then performs the process following the step 310.

As described above, according to the compact disc player having the random play means and the random play control method according to the present invention, the random process of the music stored in the disc drives and in the discs inserted in the disc drives is performed in a manner that the selection weighted value of the disc that stores the selected music is determined to be greater than that of the disc that does not store the selected music, and thus the frequency of changing the disc drive that is reproducing the music is reduced to perform the random play stably. Also, since the corresponding disc drive to be driven in the next order is in the reproduction standby state by starting in advance of reproduction thereof from the corresponding disc drive, the search response speed can be improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A random play control method for a disc player comprising the steps of:
    (a) obtaining music information from discs inserted in N (N≧2) disc drives;
    (b) determining music subject to random play and a reproduction order of the music by determining weighted values of the respective disc drives using the music information; and
    (c) randomly reproducing the music in the determined reproduction order.

2. The random play control method of claim 1, wherein the weighted value is determined based on how long the random play of the music is continuously performed in a specified disc drive.

3. The random play control method of claim 1, wherein the weighted value of the currently reproducing disc drive is determined to be greater than that of the other disc drives.

4. The random play control method of claim 1, wherein the weighted value is determined to be the same with respect to all the disc drives.

5. The random play control method of claim 1, wherein if the music to be reproduced in the next reproduction order is not stored in the currently reproducing disc drive, but is stored in the other disc drive, the corresponding disc drive to be driven in the next reproduction order is controlled to be in a reproduction standby state by starting in advance of reproduction thereof from the corresponding disc drive for a predetermined time.

6. The random play control method of claim 1, wherein determination of the reproduction order of the music according to allocation of the weighted value is performed after starting reproduction of the music designated to be first reproduced.

7. The random play control method of claim 1, wherein reproduction of the music of a first reproduction order is performed after determination of the reproduction order of the music according to allocation of the weighted value is performed with respect to the discs in all the disc drives.

8. The random play control method of claim 1, wherein the previously reproduced music is excluded from the subject of the music for the random play and the selection of the reproduction order, and only the music not reproduced is included as the subject of the music for the random play and the selection of the reproduction order.

9. The random play control method of claim 1, the music of a first reproduction order for an associated random play is designated by a user, and the music to be reproduced to follow the music of the first reproduction order and the reproduction order thereof are determined in accordance with the weighted values.

10. A random play control method for a disc player comprising the steps of:

(a) reading and storing music information from discs inserted in N (N≧2) disc drives;

(b) selecting the disc drives subject to random play;

(c) when a plurality of disc drives subject to the random play are selected, determining music to be first reproduced;

(d) allocating to each of the disc drives a weighted value that determines how long reproduction of the music subject to the random play is continuously performed in the specified disc drive in a manner that the weighted value of the disc drive that stores the music selected to be reproduced is greater than the weighted value of the disc drive that does not store the music selected to be reproduced, and determining the music to be reproduced in the next order and reproduction order in accordance with the determined weighted value; and (e) reproducing the disc where the corresponding music is recorded by driving the corresponding disc drive in accordance with the determined order.

11. The random play control method of claim 10, wherein if the music to be reproduced in the next reproduction order is not stored in the currently reproducing disc drive, but is stored in the other disc drive, the corresponding disc drive to be driven in the next reproduction order is controlled to be in a reproduction standby state by starting in advance of reproduction thereof from the corresponding disc drive for a predetermined time.

12. The random play control method of claim 10, wherein determination of the reproduction order of the music according to allocation of the weighted value is performed after starting reproduction of the music designated to be first reproduced.

13. The random play control method of claim 10, wherein reproduction of the music of a first reproduction order is performed after determination of the reproduction order of the music according to allocation of the weighted value is performed with respect to the discs in all the disc drives.

14. A random play control apparatus for a disc player, comprising:

N (N≧2) disc drives for reproducing data recorded in discs;

means for detecting music information from the discs inserted in the disc drives;

means for determining music subject to random play and a reproduction order of the music from the detected music information by applying different weighted values to the respective disc drives; and means for reproducing the corresponding music from the corresponding disc by driving the corresponding disc drive in accordance with the determined reproduction order.

15. The random play control apparatus of claim 14, wherein the weighted value is deter mined based on how long the random play of the music is continuously performed in a specified disc drive.

16. The random play control apparatus of claim 14, wherein the weighted value of the currently reproducing disc drive is determined to be greater than that of the other disc drives.

17. The random play control apparatus of claim 14, wherein if the music to be reproduced in the next reproduction order is not stored in the currently reproducing disc drive, but is stored in the other disc drive, the corresponding disc drive to be driven in the next reproduction order is controlled to be in a reproduction standby state by starting in advance of reproduction thereof from the corresponding disc drive for a predetermined time.

* * * * *